July 15, 1952 F. C. POLLARD 2,603,024
FISHING LURE

Filed May 29, 1947 2 SHEETS—SHEET 1

INVENTOR.
Frank C. Pollard
BY Victor J. Evans & Co.
ATTORNEYS

July 15, 1952 — F. C. POLLARD — 2,603,024
FISHING LURE

Filed May 29, 1947 — 2 SHEETS—SHEET 2

INVENTOR.
Frank C. Pollard
BY Victor J. Evans & Co.
ATTORNEYS

Patented July 15, 1952

2,603,024

UNITED STATES PATENT OFFICE 2,603,024

FISHING LURE

Frank C. Pollard, Palmyra, Mo.

Application May 29, 1947, Serial No. 751,281

2 Claims. (Cl. 43—42.19)

My present invention relates to fishing lures and more particularly to fishing lures including a spinner adapted to be located on the shaft of a fish lure or on the shank of a fish hook to simulate a minnow and reflect light rays to attract the fish which are sought.

The spinner of my invention comprises a highly polished curved sheet or plate of metal, having an aperture in one end portion thereof which is loosely mounted on the shaft of the fish lure or the hook shank.

In the accompanying drawings, I have illustrated one complete example of the physical embodiment of my invention according to the best mode I have thus far devised, but it will be understood that various changes and alterations may be made in the exemplified structure within the scope of the appended claims.

Figure 1:
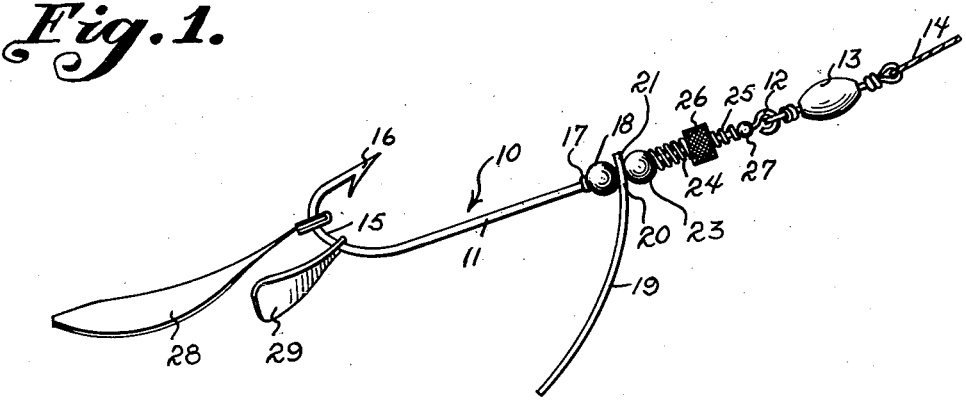
Figure 1 is an elevational view of an embodiment of my invention as attached to the shank of a hook.
Figure 2:
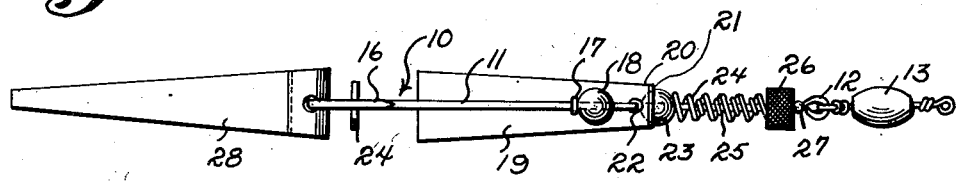
Figure 2 is a top plan view thereof.

Referring now to the drawings wherein I have illustrated the present preferred embodiment of my invention, I use a conventional hook 10 having a shank 11 and attaching eye 12 for the attachment to a swivel 13 which is attached to a fishing line 14, and a curved portion 15 terminating in a barb 16.

Figure 3:
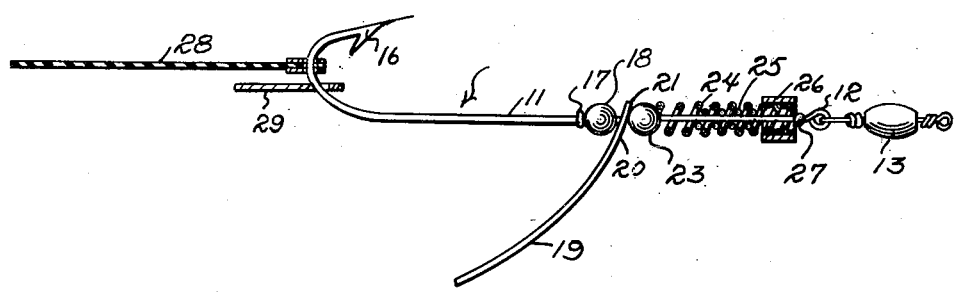
Figure 3 is a longitudinal sectional view of Figure 1 showing the spinning construction more clearly.

On the shank 11 spaced from the eye 12, I fashion a stop 17 for a ball 18, which acts as a bearing for the spinner 19. The spinner comprises a strip of metal or a plate of a concavo-convex shape, which is bent at 20 to form the short angular portion 21 having an aperture or sloppy opening 22 considerably larger than the shank diameter to permit free rotation of the spinner about the shank or swiveling longitudinally of the shank. As shown in Figures 1 and 3, one side of the portion 21 bears against the ball 18 while the ball 23 bears against the opposite side of the portion 21. The pressure of the ball 23 on the portion 21 or the distance between the balls 18 and 23 determines the pitch of the spinner or the angular relation of the spinner with the shank 11 during the rotation of the spinner.

The pressure of the ball 23 is occasioned by the use of the coil spring 24 which is threadably engaged with the coil spring 25 by the engagement of their helicals which is fixed to the shank 11 inwardly of the eye 12. Rotation of the spring 24 for the variance of the pressure thereof against the ball 23 is attained through the medium of the knurled sleeve 26 which is fixed to the rear end of the spring 24. By turning the sleeve 26, the pressure against the ball 23 is increased or decreased, as desired, thus increasing or diminishing the space between the balls and, as stated, it is the pressure of spring 24 that determines the pitch or the angular relation of the spinner with the shank. Thus in one spacing of the balls the free end portion of the spinner will be substantially parallel to the shank and with another spacing of the balls the spinner will lie at an acute angle to the shank. A stop 27 formed on the shank 11, inwardly of the eye 12, limits the action of the spring 25 rearwardly by contact of the sleeve 26 with the stop. Conventional lures 28 and 29 may be secured to the hook if found desirable.

Figure 4:
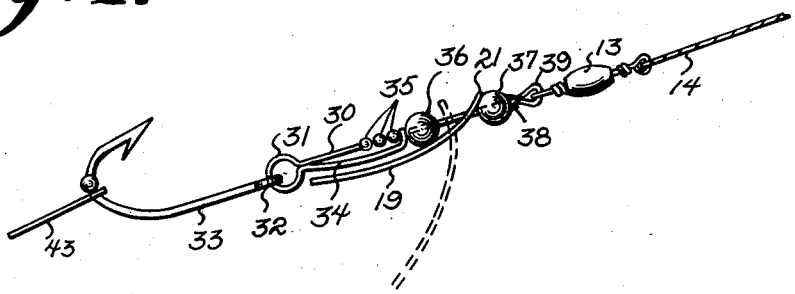
Figure 4 is a side elevational view showing an embodiment of my invention interposed between a fish hook and fishing line with the spinner in dormant position.
Figure 5:
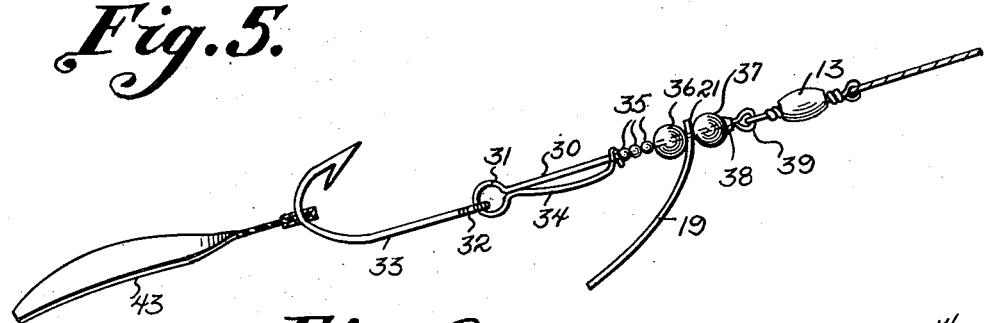
Figure 5 is the same with the spinner in extended position.

In Figures 4 and 5, the spinner may be secured on the shaft 30 which has an eye 31 formed on one end thereof for the eye 32 of the hook shank 33, and a resilient clasp 34 formed as a continuation of the eye 32 permits the selective use of small beads or bearings 35 to maintain close or loose spacing of the bearing beads 36 and 37 on the shaft 30 on opposite sides of the spinner 19, in engagement with the portion 21. The varying of the spacing of the beads or bearings permitting the free end of the spinner to lie substantially parallel to the shaft in one spacing thereof and to lie at an acute angle to the shaft at another spacing thereof.

With the small beads spaced on the shaft 30 within the clasp 34, as seen in Figure 4, and the bearing bead 36 in contact with the clasp 34 and the bearing bead 37 fixed to the stop 38 inwardly of the eye 39 to which the swivel 13 is connected, which in turn is connected to line 14, the spinner is free to swivel and rotate, as shown in dotted lines, while in Figure 5, with the bearing beads 35 outwardly of the clasp 34, and closely engaging the bearing bead 36 which in turn closely engages the spinner 19, the pitch or the angular relation of the spinner 19 to the shaft 30 is changed. The bearing bead 37 is stationary and fixed to the shaft 30 by the stop 38 while the spinner engaging bearing bead 36 is adjustable as shown by the movement of the beads 35.

Figure 6:
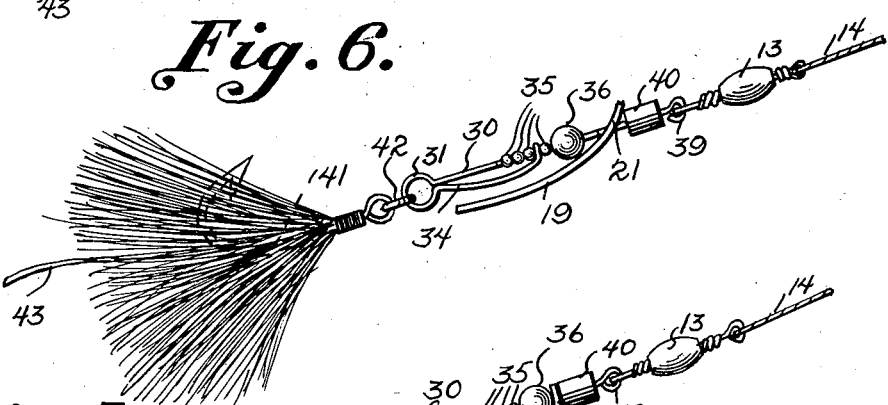
Figure 6 is another form of my invention with the spinner in dormant position.

As shown in Figure 6, the spinner is retained at a low pitch or substantially parallel to the shaft by placing one of the bearing beads 35 outwardly of the clasp 34 and back pull or resistance in the water is almost eliminated because the spinner blade turns only fast enough to create an optical illusion and to look like a minnow. In this form of the invention, the bearing bead 37 is replaced by the stop 40 fixed to the shaft 30 inwardly of the eye 29, and the lure 41 is connected to the eye 31 by the ring 42. To change the pitch of the spinner as in Figure 6, the clasp 34 is hooked over the shaft 30 with only one of the bearing beads 35 slid outwardly of the clasp and the pitch of the spinner may be thus changed until all of the bearing beads are positioned as in Figure 5. The high pitch or the acute angular relation of the spinner to the shaft is illustrated with dotted lines, in Figure 4. The spinner goes to work as an overrunning friction clutch; it spins rapidly about the shaft and in doing so transmits sufficient friction upon its bearing as to cause the spinner shaft 30 to rotate slowly, the swivel 13 permitting rotation of this shaft. The spinner, when set at the highest pitch or at an acute angle to the shaft, sets up a violent vibration of the spinner shaft and this, when transmitted to tail lure or bait 43 connected to the hook or lines, such as pork rind or worm, will give it a wiggling motion.

Figure 7:
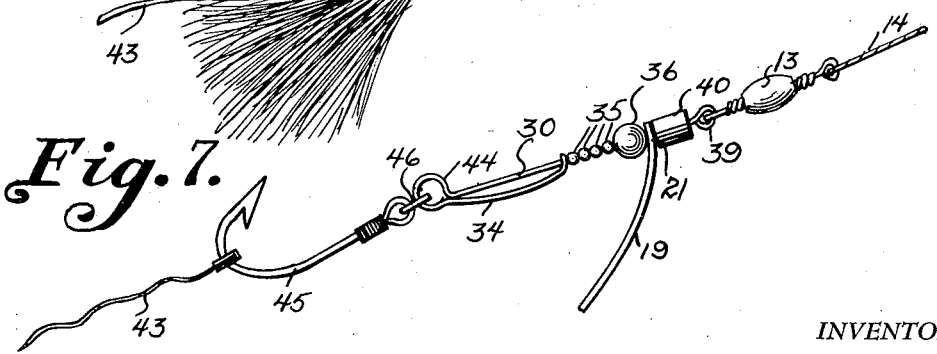
Figure 7 is the same, with the spinner in extended position.

In Figure 7, I have shown eye 44 offset slightly from its shaft 30, whereby to augment the wiggling effect upon the lure 43, which is connected to the hook 45 connected to the eye 44 of the ring 46.

Having thus fully described my invention what I claim as new and desire to secure by Letters Patent is:

1. A fishing lure comprising a shaft, bearings on the shaft, means permitting varying the spacing between the bearings, and a spinner comprising a curved plate having one end formed with an aperture to receive the shaft between the bearings, the bearings in one spaced relation thereof permitting the free end portion of the plate to lie substantially parallel to the shaft and in another spaced relation thereof permitting the free end portion to lie in a substantially acute angular relation to the shaft.

2. The apparatus as described in claim 1, wherein said means comprises a plurality of beads arranged on said shaft, and a clasp for selectively engaging said beads.

FRANK C. POLLARD.

REFERENCES CITED

The following references are of record in the file of this patent:

UNITED STATES PATENTS

| Number | Name | Date |
|---|---|---|
| 256,843 | Lowe | Apr. 25, 1882 |
| 676,521 | Weiss | June 18, 1901 |
| 771,116 | Barnhart | Sept. 27, 1904 |
| 923,854 | Kenyon | June 8, 1909 |
| 958,233 | Curtis | May 17, 1910 |
| 1,299,703 | Gray | Apr. 8, 1919 |
| 1,533,022 | Mead | Apr. 7, 1925 |
| 1,620,972 | Hobbs | Mar. 15, 1927 |
| 2,272,710 | Hoover | Feb. 10, 1942 |